Jan. 14, 1930.  R. B. FAGEOL  1,743,334
ROAD VEHICLE BODY
Filed April 23, 1923
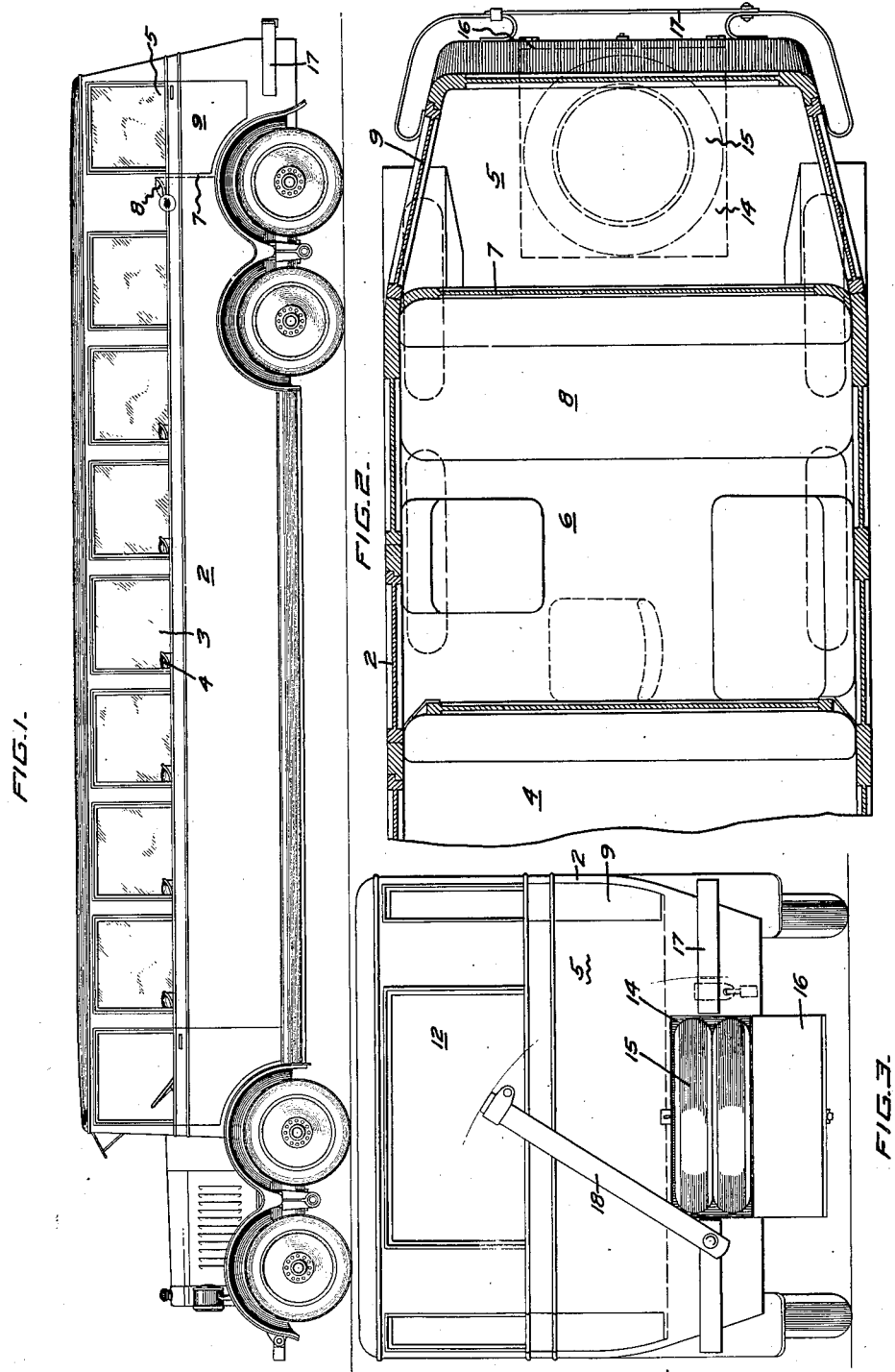
INVENTOR:
ROLLIE B. FAGEOL
BY White Prost Evans
HIS ATTORNEYS Patented Jan. 14, 1930

1,743,334

UNITED STATES PATENT OFFICE

ROLLIE B. FAGEOL, OF OAKLAND, CALIFORNIA

ROAD-VEHICLE BODY

Application filed April 23, 1923. Serial No. 633,868.

The invention relates to motor-driven, passenger-carrying, road vehicles, such as motor stages.

An object of the invention is to provide a motor stage having a luggage compartment contained within the body of the stage.

Another object of the invention is to provide a motor stage having a tire carrying compartment within the body of the stage and accessible from the rear of the stage.

The invention possesses other advantageous features, some of which with the foregoing, will be set forth at length in the following description, where I shall outline in full, that form of my invention which I have selected for illustration in the drawings accompanying and forming part of the present specification. In said drawings I have shown two different embodiments of my invention, but it is to be understood that I do not limit myself to the two forms shown, since the invention, as set forth in the claims, may be embodied in a plurality of other forms.

Referring to said drawings:—

Figure 1 is a side elevation of a motor stage embodying my invention.

Fig. 2 is a horizontal section taken through the rear part of the body of the stage shown in Figure 1.

Fig. 3 is a rear elevation of the stage shown in Fig. 1, with the central portion of the bumper raised to permit access to the tire carrying compartment.

Motor stages should be provided with accommodation for carrying the luggage of the passengers. This luggage was originally carried by arranging a rack or platform at the rear of the stage and strapping the baggage to this rack. The baggage was ordinarily covered by a large canvas cover to protect it from the dust. This arrangement, however, was extremely unsatisfactory, since it required the unstrapping of all of the luggage at each time that a passenger desired to leave the stage and because the luggage became covered with dust. Subsequently, large boxes, provided with covers were attached to the rear of the stage body and the luggage placed in these boxes. This resulted in a very unsightly vehicle and gave the general appearance of a make-shift structure. Motor stages have now definitely taken their place in our transportation systems and it is appreciated that make-shift and temporary constructions will be no longer tolerated by the traveling public. In accordance with my invention, I arrange the luggage compartment within the body of the stage so that the stage has a finished, substantial, attractive appearance.

Motor stages are now universally provided with closed bodies 2, provided along their sides with windows 3, and provided with transverse seats 4, for the passengers. At the rear of the passenger carrying compartment and within the body of the stage, I provide a luggage compartment 5, which is of the same height as the body of the vehicle, so that I obtain a substantially straight roof line and a large luggage carrying compartment. The luggage carrying compartment 5, is preferably separated from the passenger compartment 6 by a partition 7, having a window therein, but when desired, the partition may be omitted and the back of the last passenger seat 8, serve as the confining wall of the luggage compartment 5. The side walls of the body are preferably provided with doors 9, giving access to the luggage compartment, so that the luggage may be readily placed or removed. The rear wall of the body is preferably provided with a window 12, to permit the driver of the vehicle to have a view of the road behind the vehicle.

Below the luggage compartment and within the body I arrange a tire holding compartment 14, which is preferably of sufficient size to hold two superposed inflated tires 15. In the construction shown in Figs. 1, 2 and 3, this compartment 14 is provided with a rear door 16, to close the compartment. The rear of the body is preferably protected by a resilient bumper 17, supported adjacent its ends on the body and this bumper preferably lies in the plane of the door 16, so that it interferes with the opening of the door, thus preventing the removal of the tires from the compartment 14. The bumper is provided with a central pivoted section 18, which is normally locked in alinement with the remainder of the bumper. When it is desired to remove a tire from the compartment, the central pivoted section 18 is unlocked at one end and swung upward, away from the compartment 14, so that the door thereto may be opened and the tires removed.

I claim:

1. In a road vehicle, a body, a tire compartment in the bottom of the rear of said body, a swinging door for said compartment and a bumper on the rear of said body normally extending transversely across and preventing the opening of said door, said bumper including a section pivotally connected at one end for swinging movement in a vertical plane and detachably connected by a lock to the remainder of the bumper at its other end, whereby said bumper section may be swung upwardly to permit opening said door and the removal of the tires from said compartment.

2. In a road vehicle, a body, a tire compartment in the bottom of the rear of said body formed to receive a plurality of tires in a substantially horizontal position, an upwardly swinging door to close said tire compartment and a bumper normally extending across said swinging door, said bumper being provided with a removable section opposite said door, said removable section being arranged to be locked in position across said door preventing removal of said tires through said door.

3. In a road vehicle, a body, a tire compartment at the rear of said body, said tire compartment being designed to receive a plurality of tires, a swinging door to close said compartment, a bumper normally extending across said door and preventing opening thereof when said bumper is in its operative position, said bumper including a section pivotally connected at one end for swinging movement in a vertical plane to clear said door and detachably connected by a lock to the remainder of the bumper at its other end.

In testimony whereof, I have hereunto set my hand.

ROLLIE B. FAGEOL.